United States Patent
Balaguer

[11] 3,757,085
[45] Sept. 4, 1973

[54] REMOVABLE TOP WITH A HEATING ELEMENT FOR A VACUUM INSULATED BOTTLE

[76] Inventor: Rodolfo R. Balaguer, 2607 Grace Dr. Harbor Beach, Fort Lauderdale, Fla. 33312

[22] Filed: Apr. 24, 1972

[21] Appl. No.: 246,844

[52] U.S. Cl............... 219/523, 219/318, 219/386, 219/437, 219/438, 219/535, 219/542
[51] Int. Cl. ............................................. H05b 3/06
[58] Field of Search.................. 219/269, 436, 437, 219/438, 439, 441, 442, 523, 210, 312, 313, 318, 385, 386, 387, 521, 535, 541, 542; 215/47; 220/39 R, 42 C; 338/229

[56] References Cited
UNITED STATES PATENTS

| | | | |
|---|---|---|---|
| 1,520,501 | 12/1924 | Kohn | 219/318 X |
| 1,526,204 | 2/1925 | Campbell | 219/318 |
| 2,457,065 | 12/1948 | Parmley | 219/318 |
| 2,543,524 | 2/1951 | DeOliveira | 219/387 |
| 2,548,076 | 4/1951 | Strezoff | 219/313 |
| 2,858,407 | 10/1958 | Hykes | 219/210 |
| 2,925,187 | 2/1960 | Bramming | 215/13 R |
| 3,059,798 | 10/1962 | Darmstadt et al. | 215/13 R |
| 3,111,574 | 11/1963 | Spini | 219/312 |
| 2,483,979 | 10/1949 | Morrill | 219/437 |
| 2,700,097 | 1/1955 | Morey | 219/437 X |
| 3,423,571 | 1/1969 | Trachtenberg et al. | 219/441 |
| 3,536,893 | 10/1970 | Cranley | 219/523 |
| 3,549,861 | 12/1970 | Trachtenberg et al. | 219/441 |

FOREIGN PATENTS OR APPLICATIONS

| | | | |
|---|---|---|---|
| 75,032 | 5/1917 | Switzerland | 219/437 |

Primary Examiner—Volodymyr Y. Mayewsky
Attorney—Charles B. Smith and Alfred L. Michaelson

[57] ABSTRACT

A removable top for a thermos bottle. The removable top is provided with means for continuously generating heat, e.g. a resistor mounted therein which may be heated when an electric current is passed therethrough. The top is utilized in conjunction with a thermos bottle by continuously generating an amount of heat approximately equivalent to the heat which would be lost from a pre-heated material within the vacuum insulated bottle.

11 Claims, 6 Drawing Figures

PATENTED SEP 4 1973 3,757,085

REMOVABLE TOP WITH A HEATING ELEMENT FOR A VACUUM INSULATED BOTTLE

BACKGROUND OF THE INVENTION

1. Field to Which the Invention Pertains

Well known to almost everyone are vacuum insulated bottles for storing materials, for example, liquids, which vacuum bottles are of the so called thermos type. Such thermos bottles are generally comprised of a double, glass wall cylinder having a vacuum between the glass walls. The aforementioned vacuum between the walls provides substantial thermal insulation since heat cannot be transferred across the vacuum space by conduction or convection. Of course, since the glass walls are rather fragile, the glass container is generally mounted in a metal shell.

From common experience, it is also well known that the purpose of a thermos bottle is, generally, to maintain a material, e.g. a liquid, at a particular temperature for an extended period of time. In the usual practice of utilizing thermos bottles, a material is pre-heated to a particular temperature and then placed in the thermos bottle, e.g. coffee is heated and placed in a thermos bottle and the bottle is sealed with a removable top. Thus, it is the desire of a user of a thermos bottle that the preheated material placed therein be maintained at a temperature substantially equal to the initial temperature of the material when it was placed in the thermos. My invention pertains to a novel, removable top for a thermos bottle which, when used with a thermos bottle, insures that the pre-heated material placed therein will be maintained at its initial temperature for a substantial period of time.

2. Prior Art

All of the prior art of which I am aware and which relates to thermos bottles, falls into either one of two broad categories. First, there is a body of prior art relating to the physical structure of the glass walls and the methods of fabricating the same. Generally speaking, all of this art is directed at providing a container structure which has superior insulating qualities.

The second broad category of prior art pertaining to thermos bottles relates to the use of heaters for heating a material placed within the thermos bottle. For example, U.S. Pat. No. 3,549,861 discloses a self-heated thermos bottle wherein a thermos bottle is provided with a heater unit and a thermostatic switch. The objective of providing the heater unit is to provide a means for raising the temperature of a material placed within the thermos and, subsequently, maintaining the temperature of such material through the use of the thermostatic switch.

Another patent which discloses a similar construction having a similar objective is U.S. Pat. No. 2,457,065.

As will hereinafter become apparent, my invention embodies a structure and reflects an objective which is different from the inventions disclosed by the aforementioned prior art.

SUMMARY OF THE INVENTION

A pre-heated material, e.g. a liquid, placed within a thermos bottle, is maintained at substantially its initial temperature for an extended prior of time by inducing a thermal barrier at the top of the thermos bottle. The thermal barrier is induced by generating heat in the removable top of the thermos bottle. Means are provided within the removable top for generating such heat when an electric current is passed through said means, e.g. a resistor.

DETAILED DESCRIPTION OF PREFERRED EMBODIMENTS

The invention disclosed herein resulted from an investigation of the heat transfer characteristics of a thermos bottle wherein it is to be understood that the phrase thermos bottle means a container of the vacuum bottle type commonly used by the consuming public. Upon the occasion of studying the heat transfer from a Thermos bottle, it was perceived that the major amount of heat transferred from a thermos bottle (assuming that the material initially placed therein was hot) occurred through the removable top of the thermos rather than through the glass walls thereof. Thus, in a thermos bottle which does not embody my invention, a pre-heated material placed therein will cool and such cooling is substantially attributable to heat which is transferred from the material through the removable top. Thus, my invention generally embodies the provision of an active thermal barrier associated with the removable top. More specifically, my invention resides in providing a removable top for a thermos bottle which embodies therein a means for generating heat such that, in effect, a thermal barrier may be actively induced whereby there will be substantial elimination of heat transfer from the pre-heated material within the thermos bottle through the removable top.

It will thus be appreciated that my invention contemplates continuously generating, within a removable thermos bottle top, an amount of heat substantially equal to that amount of heat which otherwise would have been transferred from the pre-heated material through the removable top.

Figure 1:
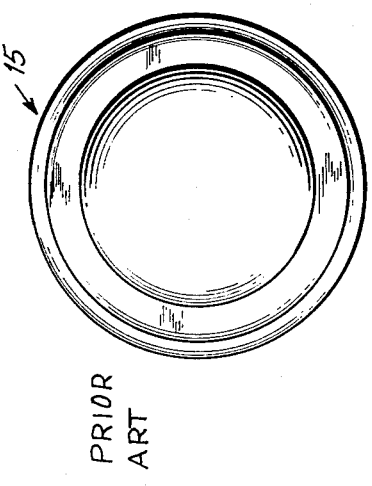
FIG. 1 is a top view of a removable Thermos bottle top of the type known to the art.
Figure 2:
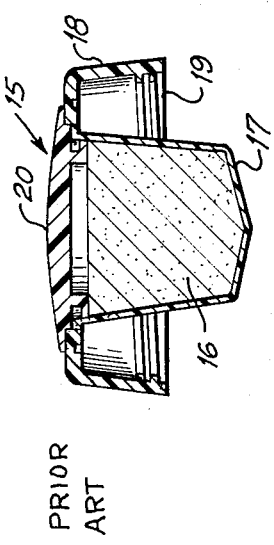
FIG. 2 is a side view, in section, of the prior art top of FIG. 1.

Referring to the drawings, wherein the same reference numbers are used for similar elements, a removable thermos bottle top of the type commonly employed by the prior art is shown in FIGS. 1 and 2. Thus, referring to FIGS. 1 and 2 and particularly to FIG. 2, it will be observed that the prior art Thermos bottle top 15 employed a substantially cylindrical member 18 having threads 19 disposed interiorly of the cylindrical member 18 at the lower portion thereof.

The generally cylindrical member 18 is sealed at one end thereof by a cap member 20 which forms the upper surface of the removable top. Depending downwardly from the upper surface of the top is a protuberance 17. The prior art endeavored to impede heat transfer through the removable top by filling the protuberance 17 with an insulating material 16, e.g. cork. While the provision of insulating materials such as 16 did, to some extent, reduce the heat transfer through the removable top 15, the resulting overall insulating qualities of the removable top were nevertheless inferior to the insulating qualities of the walls of the Thermos bottle. Thus, heat was lost through the top 15 resulting in a cooling of a heated material in a Thermos.

Figure 3:
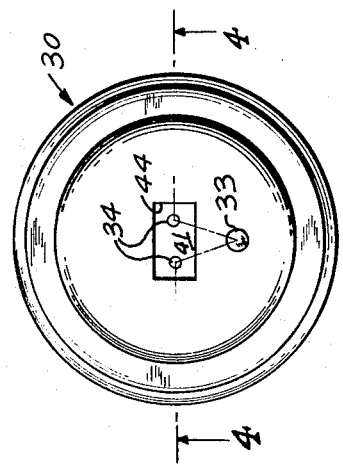
FIG. 3 is a top view of a removable Thermos bottle top embodying my invention.
Figure 4:
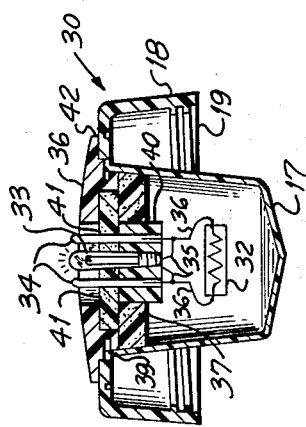
FIG. 4 is a side view, in section, of the removable Thermos bottle top of FIG. 3.

Considering FIGS. 3 and 4, there is shown a preferred embodiment of my invention. More specifically, in this embodiment I provide a removable top 30 having an exterior configuration generally similar to the removable prior art top 15 as shown in FIGS. 1 and 2. However, contrary to the prior art, the protuberance 17 is not filled with an insulating material. Rather, in accordance with my invention, means for generating heat upon the passage of an electric current are provided within the protuberance 17. Thus, in the preferred embodiment of my invention as shown most clearly in FIG. 4, a resistor 32 is disposed within the protuberance 17. The remainder of the protuberance 17 may advantageously be filled with silicone rubber. It is advantageous to fill the protuberance 17 with a material such as silicone rubber in order to obtain a more uniform heat flow and temperature distribution within and around the protuberance 17. This may be of particular importance depending upon the material which comprises the protuberance 17. That is to say, although my invention requires the generation of only a relatively small amount of heat, because of the small mass associated with the removable top and because of the efficient heat transfer within the top, certain points on the protuberance 17 might be heated to a relatively high local temperature if the heat is not uniformly distributed. Thus, by substantially filling the protuberance 17 with a material such as silicone rubber, a more uniform heat transfer is obtained with the result that the surface of the protuberance 17 is at a more uniform temperature and local high temperature points are avoided. Moreover, I have found that by substantially filling the interior of the protuberance 17 with a material such as silicone rubber, certain desirable mechanical properties associated with the protuberance are retained. More specifically, it will be recognized that when a removable top embodying my invention, such as shown in FIG. 4, is used in conjunction with a Thermos bottle, the protuberance 17 will depend downwardly into the thermos bottle and the upper peripheral surface of the protuberance 17 will engage the neck of the thermos bottle in order to provide both a mechanical and thermal seal. Thus, it is desired that the mechanical properties of the surface of the protuberance 17 should not vary when heat is generated therein. By filling the protuberance 17 with a material such as silicone rubber and thus obtaining a more uniform temperature distribution on the surface of the protuberance 17, one attains a greater assurance that the desired mechanical properties of the protuberance 17 will not be changed. In this connection, a combination which I have found to be particularly effective employs a protuberance made of Teflon and substantially filled with silicone rubber wherein the means for generating heat, e.g. a resistor, is encased within the silicone rubber. For purposes of clarity, the drawings appended hereto do not indicate the provision of a material filling the protuberance, e.g. the protuberance 17.

Although the protuberance 17 may be filled with a material, e.g. silicone rubber, the protuberance may be left empty, i.e. filled only with air, if the protuberance is constructed of certain materials. In this respect, I have found that a protuberance constructed of extruded Teflon is particularly advantageous.

While the resistor 32 may be mounted within the protuberance 17 in almost any manner, I prefer to mount the resistor 32 directly upon its associated electrical connector. Thus, in FIG. 4, there is provided an electrical connector 34 mounted in the upper surface of the removable top 30. More specifically, the electrical connector 34 is part of a male socket 40. The male socket 40 is attached at its upper surface to member 41. Member 41 is sandwiched between the cap 36 forming the upper surface of the removable top 30 and the annular member 37.

In addition, the annular member 37 is also secured to the periphery of the male socket 40. The cap 36 which forms part of the upper surface of the removable top 30 is affixed to a horizontal extension of the cylindrical member 18 as at 42. Additionally, a protruding portion of the cap 36 is affixed (sealed) to the interior of the protuberance 17 as at 39 so that liquid cannot enter the closed space within the protuberance 17. Thus, as heretofore described and as is evident from FIG. 4, there is provided a unitary, rigid structure having an exterior geometric configuration which may be substantially identical to the prior art removable top 15 as shown in FIG. 2. Obviously, such a similarity of outward geometry is advantageous in that it will permit one to employ my novel removable top in conjunction with any thermos bottle of corresponding size.

Considering further the embodiment of my invention as shown in FIG. 4, the electrical connectors 34, as heretofore described, are mounted in the upper surface of the removable top 30 and are exposed for electrical connection at said upper surface. At the other end of the electrical connector 34, leads 36 are employed both to physically mount the resistor 32 as well as providing an electrical connection.

In the preferred embodiment of my invention as shown in FIG. 4, I also provide a light 33 which may be mounted in the member 41 as shown in FIGS. 3 and 4. Within the protuberance 17, the light 33 is preferably wired in parallel with the resistor 32. When my removable top is in operation, the provision of the light 33 is desirable as an indication and reminder that power is available to the resistor.

The materials utilized for the construction of a removable top of the type shown in FIGS. 3 and 4 may generally be any form of plastic whereby one may take advantage of the manufacturing techniques associated with plastics, e.g., injection molding. Of course, when selecting materials for constructing an article which embodies my invention, due consideration would have to be given to the thermal and mechanical properties of the material, as heretofore discussed.

Figure 5:
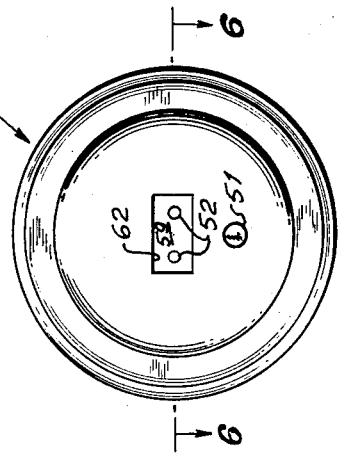
FIG. 5 is a top view of a removable Thermos bottle top which employs another embodiment of my invention.
Figure 6:
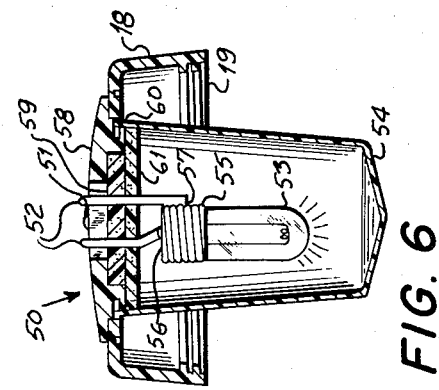
FIG. 6 is a side view, in section, of the removable Thermos bottle top of FIG. 5.

Referring to FIGS. 5 and 6 and particularly to FIG. 6, there is shown another embodiment of my invention wherein the means for generating heat is a light bulb 53. Thus, whereas the means for generating heat in the embodiment of FIG. 4 is the resistor 32, in the embodiment of FIG. 6 the resistor takes the form of a filament in the light bulb 53. As shown in FIG. 6, the light bulb 53 is mounted within a protuberance 54. The protuberance 54 depends downwardly from the upper surface of the top 50, and is attached to said upper surface as at 60. The light bulb 53, as shown in FIG. 6, may be directly connected to the electrical connector 52, for example by soldering the two elements of the electrical connector 52 to the base 55 of the light bulb 53 as at 56, 57. In the embodiment of FIG. 6, two apertures 51, 62 are provided in the cap 58 which forms a portion of the upper surface of the removable top 50. Protruding through the aperture 62 is the electrical connector 52. In the aperture 51, I provide a window. Coincidentally disposed beneath the aperture 51 in the member 58, are two other apertures, viz. apertures in the member 59 and the member 61. Each of these apertures is provided with a transparent window. In this manner, when the light bulb 53 is activated by the passage of an electric current and is generating heat within the protuberance 54, the light from the bulb 53 will pass through the transparent window disposed in the aperture 51 and through the transparent windows disposed in the apertures coincidentally disposed below thus providing an intrinsic indication that the heating process is being conducted.

While the embodiments of my invention heretofore shown and discussed employ a removable top of the type which may be screwed onto a thermos bottle, it will be evident that the operative part of my invention is the protuberance and the heating means associated therewith. Thus, it will be evident that another embodiment of my invention resides in providing only the protuberance and heating means associated therewith. The utilization of my invention in such a form is of significance since some thermos bottles are so constructed and arranged that the sealing thereof, at the open end, is attained through the use of a cork stopper. In order to provide mechanical protection with such a configuration, a cup-like member is removably mounted on the outer sleeve.

Recognizing that such stopper type thermos bottle combinations are now in use and recognizing further that my invention primarily resides in providing a protuberance and a heating means associated therewith, it will be appreciated that such a heatable protuberance or stopper may be utilized as a direct replacement for a cork-type stopper. In such an embodiment of my invention, the stopper which forms the removable top and replaces a corkstopper removable top, may be fabricated from silicone rubber. In this embodiment of my invention, the means for generating heat is an electric resistor encapsulated in the lower portion of the removable top or stopper and provided with connector leads extending through the upper portion of the removable top or stopper and exposed at the upper surface for connection to an electric source.

Considering my invention more generally, and considering the method by which one would utilize a removable thermos top embodying my invention, it is surprising to learn that the continuous generation of a relatively small amount of heat within a removable thermos bottle top provides an exceedingly efficient, active thermal barrier. The efficiency of continuously generating a small amount of heat within a thermos bottle top is evident from experiments which I have conducted to determine the size of the required components and the magnitude of such variables as the electric current flow. For example, in one experiment there was obtained two standard, one pint thermos bottles. Each of the thermos bottles was filled with one pint of water, pre-heated to a temperature of 175°F. One thermos was sealed with a standard removable top of the type generally shown in FIGS. 1 and 2. The second thermos was sealed with a removable top of the type shown generally in FIGS. 5 and 6. Both thermos bottles were then exposed to an ambient temperature of 78°F. For the duration of the test, a DC electrical current was continuously passed through the light bulb. The resistance of the light bulb and the magnitude of the DC current was sufficient to generate heat at a rate of 1.66 watts. For the duration of the test, the temperature of the water within the two containers was periodically monitored. The results of the test is set forth in table one below.

TABLE 1

| Top Closure with Invention | | | | Standard Top Closure | |
|---|---|---|---|---|---|
| TEMP. | α | WATTHOURS | | TEMP. | α T |
| 175 F. | 0 | 1.66 | 0 | 175 F. | 0 |
| 176 F. | 30 | 11.66 | 2 | 168 F. | − 7 |
| 176 F. | + 1 | 1.66 | 131½ | 140 F. | − 35 |
| 174 F. | − 1 | 1.66 | 23 | 126 F. | − 49 |
| 175 F. | 0 | 1.66 | 371½ | 110 F. | − 65 |

As is evident from considering the information presented in Table 1, by the process of continuously generating heat at a rate of, in this example, 1.66 watts, the temperature of the water in the thermos was maintained substantially constant whereas the temperature of the water in the thermos with a standard removable top cooled from 175° to 110°F.

Other experiments related to determining the efficiency of this method of maintaining constant the temperature of a material in a thermos have established that with an ambient temperature of 90°F., one may maintain, almost indefinitely, a material temperature of 175°F. with the continuous generation of only 1.4 watts of heat. In one such experiment, heat generation at the aforementioned rate was secured by connecting a 12 volt source to a 100 ohm resistor wherein the 100 ohm resistor was located within the removable top as generally shown in FIG. 4 of the drawings. Some significance may be attached to the aforementioned voltage in that such a voltage would be commonly available from an automobile electrical system, e.g. through connection to the cigarette lighter outlet. Indeed, the required rate of heat generation is sufficiently small that a size D flashlight cell can be utilized. Thus, the combination of a thermos bottle with a removable top embodying my invention and a flashlight cell would achieve the desired objective of maintaining the initial temperature of a pre-heated material within the thermos while nevertheless resulting in a completely portable article. In general, I have found that a substantially constant temperaure may be obtained through the generation of not more than 5 watts of heat.

Of course, it is evident that my invention will have utility when the material within a thermos both is pre-heated to a temperature above ambient or generally below 212°F.

Considering the embodiments of my invention heretofore described and the method of utilizing my invention, it will be evident that my invention fundamentally resides in the method of, and an article for, inducing an active thermal barrier in a thermos bottle. Thus, as hereinbefore described, I have perceived that the cooling of a heated material contained in a thermos bottle is substantially attributable to heat which is transferred through the removable top of the thermos bottle. While the prior art has endeavored to impede this heat transfer by the use of insulation, my invention contemplates providing an active thermal barrier within the thermos bottle and adjacent to the removable top. More particularly, in accordance with my invention, the interior of the thermos bottle adjacent to the top is elevated in temperature. Thus, considering a thermos bottle in an up-right condition and containing a material which was pre-heated to a particular temperature, e.g. a temperature above the ambient temperature but below the boiling point of water, heat will be transferred from such a material, through the removable top, if the temperature of the removable top or the temperature of the air between the removable top and the material within the thermos bottle is less than the temperaure of the material. Through the mechanism of raising the temperature of the removable top by generating heat therein (and thus raising the temperature of the air which may be located between the material and the removable top), heat transfer from the material is reduced in accordance with fundamental thermodynamic and heat transfer principles. Moreover, if the temperature of the removable top and the air surrounding the removable top within the thermos is elevated to a temperature equal to or greater than the temperature of the material within the thermos bottle, heat transfer from the material through the removable top will not occur. Thus, by generating an active, thermal barrier, the initial temperature of a heated material placed within the thermos bottle may be maintained at a substantially constant value for an extended period of time. While the description of my invention hereinbefore presented has particularly described the heat generation characteristics of my invention, it may be observed that the nature of my invention is such that other desirable objectives are simultaneously realized. For example, since, according to my invention, the means for generating heat is embodied in or associated with the removable top, there are no elements which extend far below the removable top. That is to say, in prior art thermos bottle combinations, heater elements were sometimes employed which extended from the thermos bottle top and were of a length substantially greater than the height of the removable top. Thus, when such removable top-heater combinations were employed, the heater would extend for a substantial distance into the thermos bottle. A number of disadvantages attend the use of such a combination. For example, if the material placed within the thermos bottle is not a liquid, the heater element may interfere with the solid material and prevent the closing of the thermos bottle by the removable top. Alternatively, if the material in the thermos bottle is a liquid and if the Thermos bottle is substantially full, insertion of the heater element into the liquid during the closing operation may cause an overflow. Moreover, when the top is removed and the heater is withdrawn, some dripping will almost inevitably result. These disadvantages are substantially avoided by the practice of my invention since, as is evident from a consideration of my invention as shown in FIGS. 4 and 6, the protuberance does not extend downwardly for a distance which is substantially greater than the height of the generally cylindrical walls 18.

With regard to the height of the protuberance, I have found it advantageous to employ a protuberance which is approximately 2 inches in height. Further, through experiments which I have conducted, I have determined that it is advantageous to locate the heating means, e.g. a resistor, in the lower portion of the protuberance. For example, the resistor may be horizontally disposed an eighth of an inch above the bottom surface of the protuberance. Of course, while the height of the protuberance may vary depending upon such factors as the size of the associated thermos bottle and the construction of the removable top, it will be observed that the protuberance will always be of a height which is substantially less than the height of the thermos bottle. In this manner, the disadvantages previously described with regard to immersion heaters are avoided.

While I have hereinbefore set forth, by way of example, a number of embodiments of my invention, still other embodiments may be readily perceived by those skilled in the art to which this invention pertains. For example, in the embodiments of my invention disclosed herein, the heat generating means, e.g. a resistor, has been disposed within the top in a particular manner.

Clearly, the manner in which the resistor is disposed within the top is of little significance. Similarly, the specific nature of the resistor employed for the generation of heat upon the passage of an electric current may take any one of a number of forms. To the same effect, there is generally no criticality associated with the nature of the electric current, i.e., it could be either AC or DC. With further regard to the resistor for generating heat, such a resistor may be provided as an integral part of the protuberance.

Having set forth exemplary embodiments of my invention, the scope of my invention is to be determined by the claims appended hereto.

I claim:

1. A removable top for a thermos bottle which comprises:
    a. an electrically and thermally non-conductive, generally cylindrical member, sealed at one end to form the upper surface of said top and having interior thread means;
    b. an electrically and thermally non-conductive, generally cylindrical protuberance depending downwarding from said upper surface and of a length not substantially greater than the height of said generally cylindrical member, the top of said protuberance sealed to said upper surface and the bottom of said protuberance being sealed, thereby defining a closed space within said protuberance;
    c. a heat generating resistor mounted within the closed space of said protuberance; and
    d. an electrical connector mounted in said upper surface, exposed for electrical connection at the top of said upper surface and electrically connected to said resistor.

2. The device of claim 1 wherein said protuberance is substantially filled with silicone rubber.

3. The device of claim 1 wherein said generally cylindrical member and said protuberance are plastic.

4. The device of claim 3 wherein said resistor is a light bulb.

5. The device of claim 3 wherein said protuberance is extruded polytetrafluoroethylene.

6. The device of claim 5 wherein said protuberance is substantially filled with silicone rubber.

7. The device of claim 1 wherein said resistor is a light bulb.

8. The device of claim 7 wherein at least a portion of the upper surface of said top is transparent whereby light from said light bulb may pass there through.

9. The device of claim 7 wherein said protuberance is substantially filled with silicone rubber.

10. The device of claim 7 wherein said generally cylindrical member and said protuberance are plastic.

11. The device of claim 10 wherein said protuberance is extruded polytetrafluoroethylene.

* * * * *

UNITED STATES PATENT OFFICE
CERTIFICATE OF CORRECTION

Patent No. 3,757,085                                Dated Sept. 4, 1973

Inventor(s) Rodolfo R. Balaguer

It is certified that error appears in the above-identified patent and that said Letters Patent are hereby corrected as shown below:

TABLE 1

| TOP CLOSURE WITH INVENTION | | | | STANDARD TOP CLOSURE | |
|---|---|---|---|---|---|
| Temp. | ΔT | Watt | Hours | Temp. | ΔT |
| 175 F. | 0 | 1.66 | 0 | 175 F. | 0 |
| 176 F. | +1 | 1.66 | 2 | 168 F. | -7 |
| 176 F. | +1 | 1.66 | 13 ½ | 140 F. | -35 |
| 174 F. | -1 | 1.66 | 23 | 126 F. | -49 |
| 175 F. | 0 | 1.66 | 37 ½ | 110 F. | -65 |

Signed and sealed this 1st day of January 1974.

(SEAL)
Attest:

EDWARD M. FLETCHER, JR.          RENE D. TEGTMEYER
Attesting Officer                Acting Commissioner of Patents